(12) United States Patent
William Earl et al.

(10) Patent No.: US 8,975,853 B2
(45) Date of Patent: Mar. 10, 2015

(54) METHODS AND SYSTEMS FOR IMPROVING POSITIONING ACCURACY

(76) Inventors: Singhose William Earl, Atlanta, GA (US); Joshua Vaughan, Atlanta, GA (US)

( * ) Notice: Subject to any disclaimer, the term of this patent is extended or adjusted under 35 U.S.C. 154(b) by 565 days.

(21) Appl. No.: 13/155,898

(22) Filed: Jun. 8, 2011

(65) Prior Publication Data

US 2011/0298409 A1    Dec. 8, 2011

Related U.S. Application Data

(60) Provisional application No. 61/352,598, filed on Jun. 8, 2010.

(51) Int. Cl.
*G05B 11/01* (2006.01)
*G05B 5/01* (2006.01)

(52) U.S. Cl.
CPC .................................... *G05B 5/01* (2013.01)
USPC ........................ 318/560; 318/466; 318/468

(58) Field of Classification Search
USPC ......... 318/560, 445, 446, 449, 466, 468, 470, 318/489
See application file for complete search history.

(56) References Cited

U.S. PATENT DOCUMENTS

| | | | |
|---|---|---|---|
| 4,916,635 A | | 4/1990 | Singer et al. |
| 5,638,267 A | | 6/1997 | Singhose et al. |
| 5,785,191 A | * | 7/1998 | Feddema et al. ............. 212/275 |
| 5,908,122 A | * | 6/1999 | Robinett et al. ............. 212/275 |
| 6,050,429 A | * | 4/2000 | Habisohn .................... 212/275 |
| 6,102,221 A | * | 8/2000 | Habisohn .................... 212/270 |
| 6,826,452 B1 | * | 11/2004 | Holland et al. ............... 700/245 |
| 6,920,378 B2 | | 7/2005 | Eloundou et al. |
| 7,185,774 B2 | * | 3/2007 | Colgate et al. ............... 212/331 |
| 7,970,521 B2 | | 6/2011 | Sorensen et al. |
| 2008/0281464 A1 | * | 11/2008 | Sorensen et al. ............. 700/213 |

OTHER PUBLICATIONS

W. Singhose, L. J. Porter, T. D. Tuttle, and N. C. Singer, "Vibration Reduction Using Multi-Hump Input[]," American Control Conference, 1995.
W. Singhose, N. Singer, and W. Seering, "Time-Optimal Negative Input Shapers," ASME J. Dynamic Systems, Measurement, and Control, vol. 119, No. June, pp. 198-205, 1997.

(Continued)

*Primary Examiner* — Rina Duda
(74) *Attorney, Agent, or Firm* — Minh N. Nguyen; Next IP Law Group LLP (57) ABSTRACT

A human-operated system comprises a positioning system and an input shaper. The positioning system moves an object from one location to another. The positioning system includes a computing device that controls the movement of the positioning system responsive to receiving a user command. The input shaper is coupled to the computing device of the positioning system. The computing device estimates an overtravel of the positioning system and determines an overtravel constraint that is factored into the movement of the positioning device. The computing device moves the positioning system based on the overtravel constraint in a manner that limits the overtravel, deflection and vibration of the object as the object is moved from one location to another. The human-operated system includes a predictive element that represents a predictor location responsive to the user command provided by the human operator, which aids the human operator position the positioning system.

20 Claims, 12 Drawing Sheets

(56) References Cited

OTHER PUBLICATIONS

S.S. Gurleyuk, "Optimal unity-magnitude input shaper duration analysis," Archive of Applied Mechanics, vol. 77, No. 1, pp. 63-71, 2007.

J. Vaughan, P. Jurek, and W. Singhose, "Reducing Overshoot in Human-Operated Flexible Systems," ASME J. Dynamic Systems [ . . . ], vol. 133, pp. 011010-1-10, 2011.

W. Singhose, E. Biediger, Y.-H. Chen, and B. Mills, "Reference command shaping [ . . . ]," J. of Dynamic [ . . . ], vol. 126, pp. 210-214, Mar. 2004.

J. Vaughan, A. Yano, and W. Singhose, "Robust negative input shapers for vibration suppression, " J. of Dynammic Systems [ . . . ], vol. 131, No. 3, p. 031014, 2009.

J. Lawrence and W. Singhose, "Design of a minicrane for education and research," in 6th Int. Conference on Research and Education in Mechatronics, Annecy, France, 2005.

F. Buzan and T. Sheridan, "A model-based predictive operator aid for telemanipulators with time delay," in IEEE Int. Conference on Systems[ . . . ], NY, NY USA 1989, pp. 138-143.

O. J. M. Smith, Feedback Control Systems. New York: McGraw-Hill Book Co., Inc.1958.

W. Singhose and Eric Kriikku, "An input shaping controller enabling cranes to move without sway," American Nuclear Society 7th Topical meeting on Robotics and Remote Systems.

N. C. Singer and W. P. Seering, "Preshaping Command Inputs to Reduce System Vibration," Journal of Dynamic Systems, Measurement, & Control, vol. 112, No. 1, pp. 76-82, 1990.

O. J. M. Smith, "Posicast Control of Damped Oscillatory Systems," Proceedings of the IRE, vol. 45, No. September, pp. 1249-1255, 1957.

W. Singhose, W. Seering, and N. Singer, "Residual Vibration Reduction Using Vector Diagrams to Generate [ . . . ]," J. of Mechanical Design, vol. 116, No. June, pp. 654-665, 1994.

W. Singhose, W. Seering, and N. Singer, "Input Shaping for Vibration Reduction with Specified [ . . . ]," Japan-USA Sym. on Flexible Automation, Boston, MA, pp. 307-313, 1996.

D. Kim and W. Singhose, "Performance Studies of Human Operators Driving Double-Pendulum Bridge Cranes," Control Engineering Practice, vol. 18, No. June, pp. 567-576, 2010.

W. E. Singhose, E. A. Crain, and W. P. Seering, "Convolved and Simultaneous Two-Mode Input Shapers," IEE Control Theory and Applications, vol. 144, No. Nov., pp. 515-520, 1997.

J. M. Hyde and W. P. Seering, "Using Input Command Pre-Shaping to Suppress Multiple Mode [ . . . ]." IEEE Int. Conf. on Robotics and Automation, Sacramento, CA, pp. 2604-2609, 1991.

W. Singhose, D. Kim, and M. Kenison, "Input Shaping Control of Double-Pendulum [ . . . ]," ASME J. Dynamic Systems, Measurement, and Control, vol. 130, No. May, pp. 034504, 2008.

W. Singhose, S. Derezinski, and N. Singer, "Extra-Insensitive Input Shapers for [ . . . ]," AIAA J. of Guidance, Control, and Dynamics, vol. 19, No. 2, pp. 385-391, 1996.

\* cited by examiner

METHODS AND SYSTEMS FOR IMPROVING POSITIONING ACCURACY

CROSS-REFERENCE TO RELATED APPLICATIONS

This application claims the benefit of U.S. provisional application entitled, "Methods for Improving Positioning Accuracy in Human Operated Flexible Systems," having Ser. No. 61/352,598, filed on Jun. 8, 2010, which is entirely incorporated herein by reference.

TECHNICAL FIELD

The various embodiments of the present disclosure relate generally to control systems and methods. More particularly, the various embodiments of the present disclosure are directed to human-operated systems that have flexible dynamics.

BACKGROUND

Figure 1:
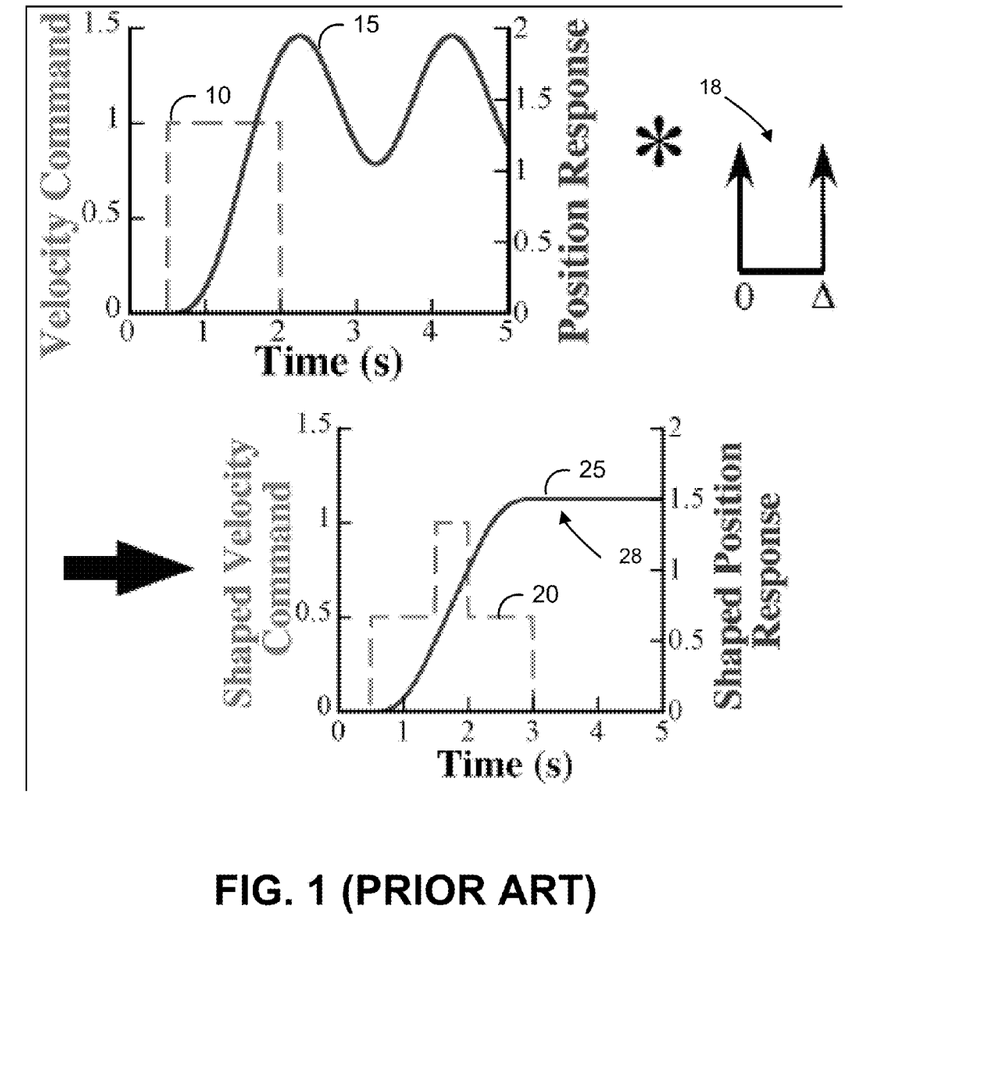
FIG. 1 is a graph that illustrates the relationships of time, velocity command, and position response, and the relationships of time, shaped velocity command, and shaped position response in a conventional input-shaping control process.

Flexible systems are difficult to control because they respond to human-operator commands with deflection and vibration that makes them difficult to move and accurately position. Input shaping is a control technique that reduces unwanted flexible responses by slightly modifying the human-operator command in real time. This modification is accomplished by convolving the unwanted flexible responses with a series of impulses called an input shaper. The input shaper is designed using estimates of the system's natural frequency and damping ratio. This process is demonstrated in FIG. 1 using a two-impulse sequence called a zero vibration (ZV) shaper. The upper left of FIG. 1 shows a pulse 10 in velocity and the position response 15 of a flexible system to the pulse command. When the pulse 10 is properly shaped by convolving it with the impulses 18, the staircase command 20 at the bottom of the figure is produced. Using the shaped command 20, the response 25 of the flexible system does not have residual vibration 28.

The penalty for the dramatic reduction in system vibration 28 can be a slight lengthening of the shaped command 20 by an amount equivalent to the duration of the input shaper (typically 0.5-1.5 vibration periods). This increase in command duration not only slightly increases the rise time of the shaped command 20, but can cause some additional system motion after the human operator has commanded the system to stop. This additional motion contributes to suppressing the vibration excited during the deceleration portion of the command 20. However, to accurately position a system, the human operator typically estimates the deceleration travel time and the resulting distance. This effect may make precise positioning of the system difficult, especially for inexperienced operators. Using longer duration shapers, such as those designed to be extremely robust to parameter variations or to eliminate multiple modes of vibration can exacerbate this effect.

FIG. 1 showed that a ZV-shaped pulse command 20 is longer than the unshaped reference command 10. In the figure, an ideal pulse 10 in velocity was shown. However, the velocity of real systems cannot typically be changed instantaneously. Therefore, velocity pulse commands are rate-limited and changed to a shape similar to trapezoids, where the positive and negative steps of the pulse are changed to ramps. The resulting trapezoidal profile can be categorized by its ramp time, which is the time it takes to accelerate to (and decelerate from) maximum velocity.

SUMMARY

The human-operated systems considered here are comprised of a positioning system and an input shaper. The positioning system moves an object from one location to another. The positioning system includes a computing device that controls the movement of the positioning system responsive to receiving a user command. The input shaper is coupled to the computing device of the positioning system. The computing device estimates the overtravel of the positioning system and determines an overtravel constraint that is factored into the movement of the positioning device. The computing device moves the positioning system based on the overtravel constraint in a manner that limits the overtravel, deflection and vibration of the object as the object is moved from one location to another. The human-operated system can include a predictive element that represents a predictor location responsive to the user command provided by the human operator, which aids the human operator to accurately position the system.

These and other aspects of the present invention are described in the Detailed Description below and the accompanying figures. Other aspects and features of embodiments of the present invention will become apparent to those of ordinary skill in the art, upon reviewing the following description of specific, exemplary embodiments of the present invention in concert with the figures. While features of the present invention may be discussed relative to certain embodiments and figures, all embodiments of the present invention can include one or more of the features discussed herein. While one or more embodiments may be discussed as having certain advantageous features, one or more of such features may also be used with the various embodiments of the invention discussed herein. In a similar fashion, while exemplary embodiments may be discussed below as system or method embodiments, it is to be understood that such exemplary embodiments can be implemented in various devices, systems, and methods of the present invention.

BRIEF DESCRIPTION OF DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, the reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

To facilitate an understanding of the principles and features of the present invention, various illustrative embodiments are explained below. In particular, the invention is described in the context of being used for positioning systems and methods (e.g., crane control systems and methods). Embodiments of the invention, however, are not limited to only use in systems and methods for controlling a crane. As those of ordinary skill in the art would understand, embodiments of the invention can be used by other systems or methods for controlling other systems where positioning ease and accuracy is beneficial.

In addition to the primary application discussed in much of the text, the improved positioning afforded by reduced overtravel (RO) input shapers, predictive elements, or a combination of the two could be used to improve the positioning performance for a variety of human-operated machines or systems. For example, heavy machinery such as excavators and large bucket lifts (commonly called cherrypickers) would benefit from both the vibration reduction provided by input shaping and the positioning improvements provide by the current invention.

In addition, many remotely-controlled devices would also benefit from the application of the current disclosure. These include robotic tele-surgery and larger applications, such as long-reach robotic arms or other mobile robots. Such arms are often employed in space applications; both the space shuttles and the International Space Station have long reach arms. Similar arms are likely to be included in many future space vehicles.

An additional place where this technology could be applied is to helicopters manipulating slung loads. There are numerous places where helicopters are essentially used as flying cranes, including military applications, humanitarian operations, and logging. The method for precisely positioning these payloads follows a similar logic as that for improving positioning on traditional cranes.

The components described hereinafter as making up various elements of the invention are intended to be illustrative and not restrictive. Many suitable components or steps that would perform the same or similar functions as the components or steps described herein are intended to be embraced within the scope of the invention. Such other components or steps not described herein can include, but are not limited to, for example, similar components or steps that are developed after development of the invention.

Figure 2:
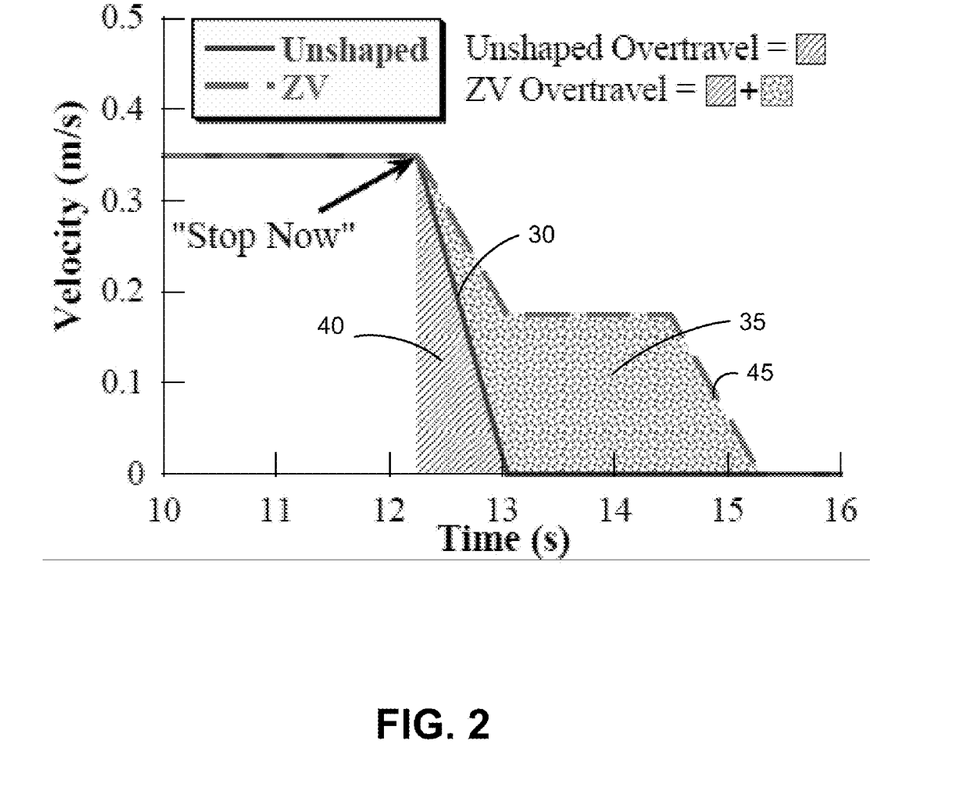
FIG. 2 is a graph that illustrates the relationship of time and velocity at a stopping portion of a velocity command in accordance with an embodiment of the present disclosure.

When the rate-limited velocity commands are used in conjunction with a human operator, even the unshaped command will move the system beyond where the human operator issues the "Stop Now" command. This is shown in FIG. 2, where the ramp 30 to zero velocity takes a finite amount of time. During this time the positioning system 310 (FIG. 3) can continue to move. The distance it moves is equal to the area of the hatched region 40 in FIG. 2. As a result, real systems have some amount of overshoot beyond the point where the operator issues the "Stop Now" command.

Also shown in FIG. 2 is the ZV-shaped version of the same velocity command. In FIG. 2, the ZV-shaped command 45 takes longer to reach zero velocity than the unshaped command. The distance that the system can move after the "Stop Now" command is the sum of the hatched and shaded regions 35, 40. In addition, the overtravel caused by the input shaper is equal to the shaded region 35. The shaper-induced overtravel is a function of the impulses in the input shaper. Therefore, the input shaper can be designed to reduce the amount of overtravel. When this is done properly, the human operator can more accurately position the system. In addition, the control system can be equipped with a system that helps the operator predict where the system will stop. Such a feature makes it easier for the human operator to position the system at a desired location.

Figure 3:
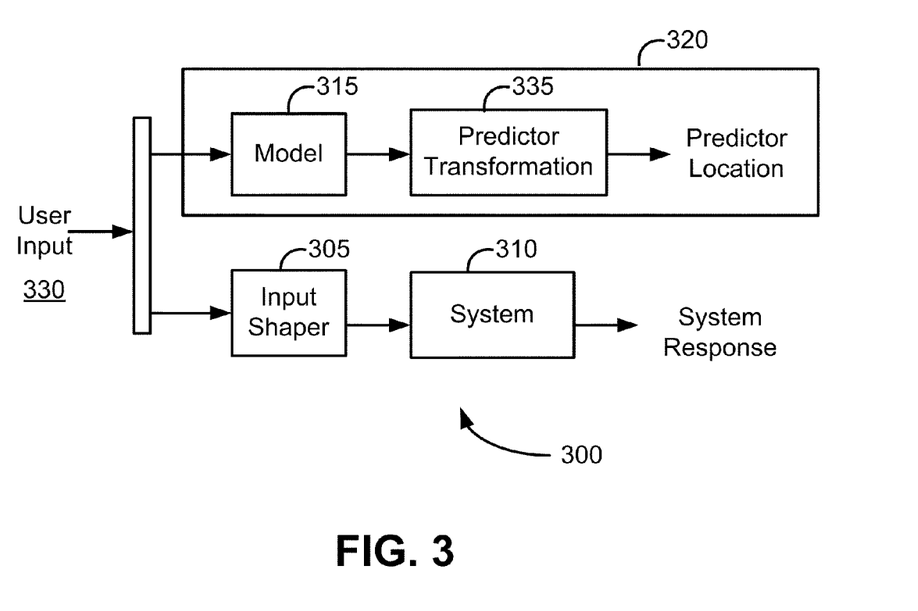
FIG. 3 is a block diagram that illustrates a human-operated system including a predictive element and an input shaper that are used to help a human operator control a positioning system in accordance with an embodiment of the present disclosure.

FIG. 3 is a block diagram that illustrates a human-operated system 300 including a predictive element 320 and an input shaper 305 used to help a human operator control a positioning system 310 (e.g. a crane) in accordance with an embodiment of the present disclosure. The input shaper 305, the positioning system 310, and predictive element 320 can be used to determine a stopping position of the positioning system 310 responsive to the operator issuing a user input or command 330, e.g., a "Stop Now" command. The predictive element 320 aids the operators of the positioning system 310 by helping them estimate the overtravel, which is based on the baseline system and the input shaper 305. The predictive element 320 can indicate where the payload (or object) will stop if the operator gives no further input. In order to properly predict where the positioning system 310 will stop at the completion of an input-shaped command, the original reference command is fed to a model at the predictive element 320. This model 315 is a rigid-body approximation and may not account for the flexible dynamics of the positioning system 310. The input shaper 305 can effectively reduce vibration to a level such that the rigid-body estimation is sufficient to predict the stopping position of the positioning system 310. The input shaper 305 and predictive element 320 are further described in connection with FIGS. 4 and 5.

To properly indicate the final location of the object, a predictor transformation unit 335 is used to properly scale the predictor location. The physical workspace of the positioning system 310 and object can be shown in a way that is representative of their true size. Once this scaling factor is determined, the response of the rigid-body model is also scaled by the same factor, so that the predictor motion on a given interface is representative of the modeled rigid-body motion in the physical workspace. For example, on a GUI, scaling between the physical motion of the positioning system and screen pixels needs to be determined and used to scale indication of both the system motion and the predictive element 320 on the GUI.

Figure 4:
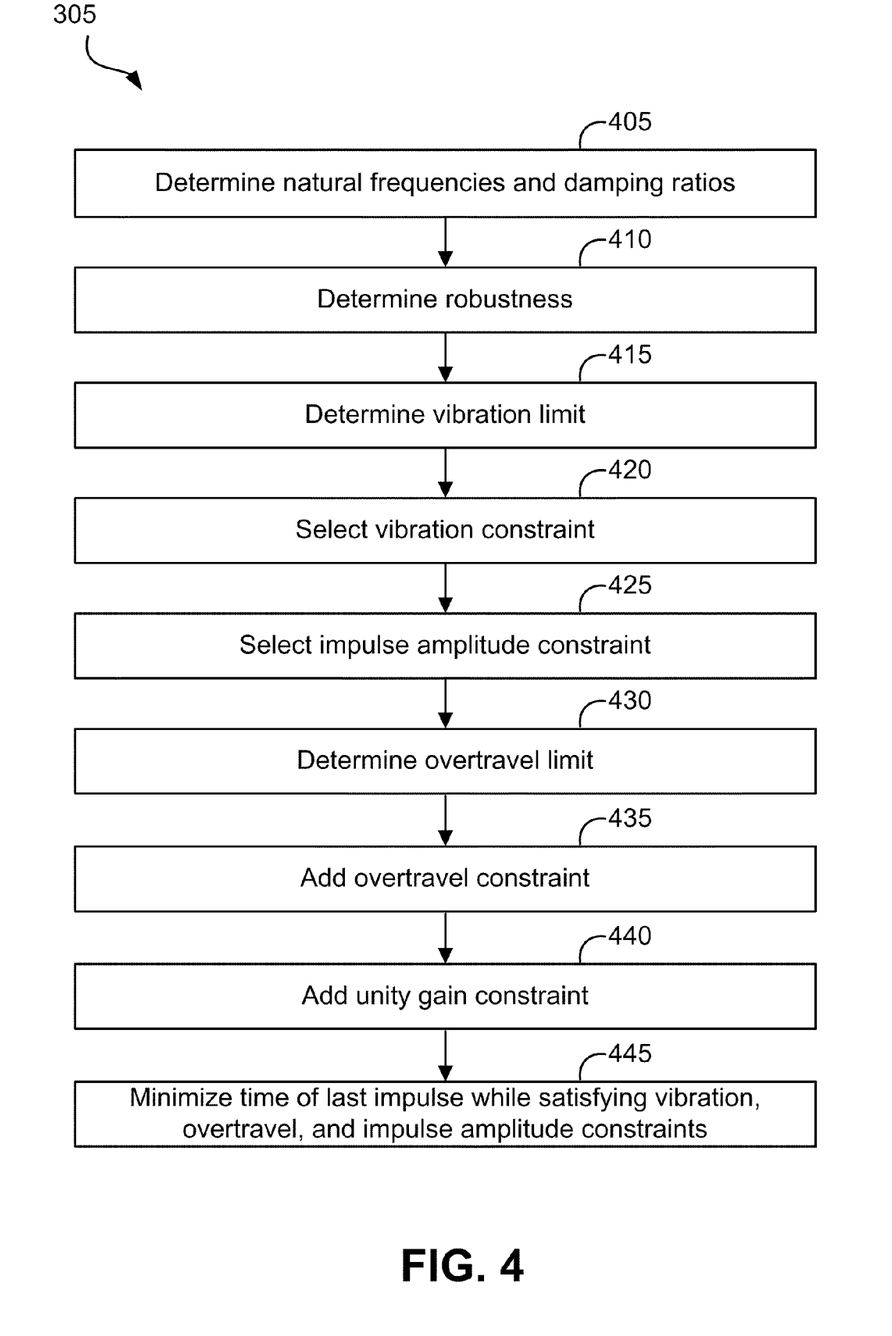
FIG. 4 is a flow chart that illustrates a method for designing a reduced overtravel (RO) input shaper in accordance with an embodiment of the present disclosure.

FIG. 4 is a flow chart that illustrates a method for designing a reduced overtravel (RO) input shaper 305 in accordance with an embodiment of the present disclosure. In block 405, the procedure for designing the input shaper 305 is to determine nominal values of natural frequencies and damping ratios of the dominant system modes. For many applications the lowest dominant node can be used to suppress system oscillation to an acceptable level, but incorporating higher modes into the solution procedure can also be achieved. In block 410, the procedure for designing the input shaper 305 is to determine robustness around each of the modes that will be suppressed. Based on the determination from blocks 405 and 410, the procedure for designing the input shaper 305 in block 415 is to determine the vibration limit (e.g., amplitude of residual vibration to which the shaper will reduce the vibration).

Following the determination of the properties of the modes that can be suppressed, the level of suppression should be selected. In block 420, the vibration limit is then used to select at least one vibration constraint over the selected ranges of frequencies. In addition to the vibration constraint, additional constraints on impulse amplitude can be selected, as shown in block 425. For example, one constraint on impulse amplitude is selecting the maximum impulse amplitudes. In addition, the change between successive impulses can be included as an impulse amplitude constraint. Both of these can be determined by system actuation limits.

Following selection of the impulse amplitude constraint, a limit on the overtravel of the positioning system 310 is selected, as shown in block 430. From this, a constraint on overtravel can be formed and factored in the method for designing a reduced overtravel (RO) input shaper 305, as shown in block 435. A unity gain constraint (that the sum of all shaper impulses is one) can also be added in the method for a reduced overtravel (RO) input shaper 305, as shown in block 440. The above constraints are applied in the calculation for the reduced overtravel shaper, while minimizing the time of the last impulse, as shown in block 445. The blocks described above can further be described below and expressed in equations.

Given that input shapers 305 can cause overtravel and overshoot, Equation 1 provides an expression for the overtravel independent of the reference command, which is as follows:

$$x^+ \equiv x(t_n + t_f) - x(t_f) = V_{stop} \sum_{i=2}^{n} A_i t_i \qquad \text{Eq. 1}$$

where n is the number of input shaper impulses, $t_f$ is "stopping" time, $V_{stop}$ is the velocity when the deceleration portion of the command begins, and $A_i$ and $t_i$ are $i^{th}$ impulse amplitude and time location, respectively.

It is useful to describe the overtravel independent of the reference command and system parameters. To do so, Equation 1 can be normalized as expressed in Equation 2 by multiplying by $V_{stop}\tau^{-1}$, where $\tau$ is the vibration period the shaper 305 was designed for:

$$\bar{x}^+ \equiv \bar{x}(t_n + t_f) - \bar{x}(t_f) = \frac{1}{\tau}\sum_{i=2}^{n} A_i t_i \qquad \text{Eq. 2}$$

The normalized overtravel equation, Equation 2, leads to a new constraint on the shaper-induced overtravel, which is expressed in Equation 3 as follows:

$$\bar{x}^+ \equiv \frac{1}{\tau}\sum_{i=2}^{n} A_i t_i \leq \bar{x}_{des}^+ \qquad \text{Eq. 3}$$

where $\bar{x}_{des}^+$ is the desired amount of shaper-induced overtravel. This constraint can be applied in addition to any desired vibration constraints. It is important to note, however, that to reduce the amount of shaper-induced overtravel, negative impulses can be used in the input shaper 305.

Zero Vibration-Reduced Overtravel (ZV-RO) shapers 305 can limit both residual vibration and shaper-induced overshoot to zero. The residual vibration constraints are similar to the ZV shaper 305, to limit the residual vibration to zero at the design frequency. The residual vibration of a second-order underdamped system from a series of n-impulses, expressed as a percentage of the vibration excited by a unity-magnitude impulse at time zero, is one such design constraint can be a limit on the amplitude of vibration caused by the input shaper 305.

In this embodiment, the Normalized Residual Vibration ("NRV") amplitude of an underdamped, second-order system from a sequence of n impulses is represented by Equation 4:

$$NRV = V(\omega,\zeta) = e^{-\zeta \omega t_n}\sqrt{[C(\omega,\zeta)]^2 + [C(\omega,\zeta)]^2} \qquad \text{Eq. 4}$$

where $C(\omega,\zeta)$ can be defined by Equation 5, and $S(\omega,\zeta)$ can be defined by Equation 6:

$$C(\omega, \zeta) = \sum_{i=1}^{n} A_i e^{\zeta \omega t_i}\cos(\omega t_i \sqrt{1-\zeta^2}) \qquad \text{Eq. 5}$$

$$S(\omega, \zeta) = \sum_{i=1}^{n} A_i e^{\zeta \omega t_i}\sin(\omega t_i \sqrt{1-\zeta^2}) \qquad \text{Eq. 6}$$

where $\omega$ is the natural frequency of the positioning system, $\zeta$ is the damping ratio, and $A_i$ and $t_i$ are the $i^{th}$-impulse amplitude and time, respectively. Equation 4 can give the ratio of vibration with input shaping to that without input shaping. A constraint on residual vibration can be formed by setting Equation 4 less than the tolerable level of vibration. This vibration constraint is then combined with the constraint on overtravel expressed in Equation 3.

Shapers 305 can limit the overtravel caused by an input-shaped command to that of the unshaped reference command. This is accomplished by adding an additional zero-overtravel constraint in Equation 3, to the input-shaper design constraints. If the desired overtravel is set to some negative value, then the shaped command can return the system 310 to a position with less final overtravel than the original, unshaped command. If the unshaped reference command is known, then a shaper 305 can be generated that results in zero (or near-zero) final overtravel.

A constraint on residual vibration amplitude can be formed by setting Equation 4 less than or equal to a tolerable level of residual vibration at the modeled natural frequency and damping ratio. In an exemplary embodiment of the present invention, the input-shaping module is a Zero Vibration ("ZV") input-shaping module, such that the tolerable amount of vibration is set to zero. This can result in the shaper 305 illustrated in Equation 7:

$$ZV = \begin{bmatrix} A_i \\ t_i \end{bmatrix} = \begin{bmatrix} \dfrac{1}{1+K} & \dfrac{K}{1+K} \\ 0 & \dfrac{\pi}{\omega\sqrt{1-\zeta^2}} \end{bmatrix} \qquad \text{Eq. 7}$$

where K is represented by Equation 8.

$$K = e^{\dfrac{-\zeta\pi}{\sqrt{1-\zeta^2}}} \qquad \text{Eq. 8}$$

Figure 5:
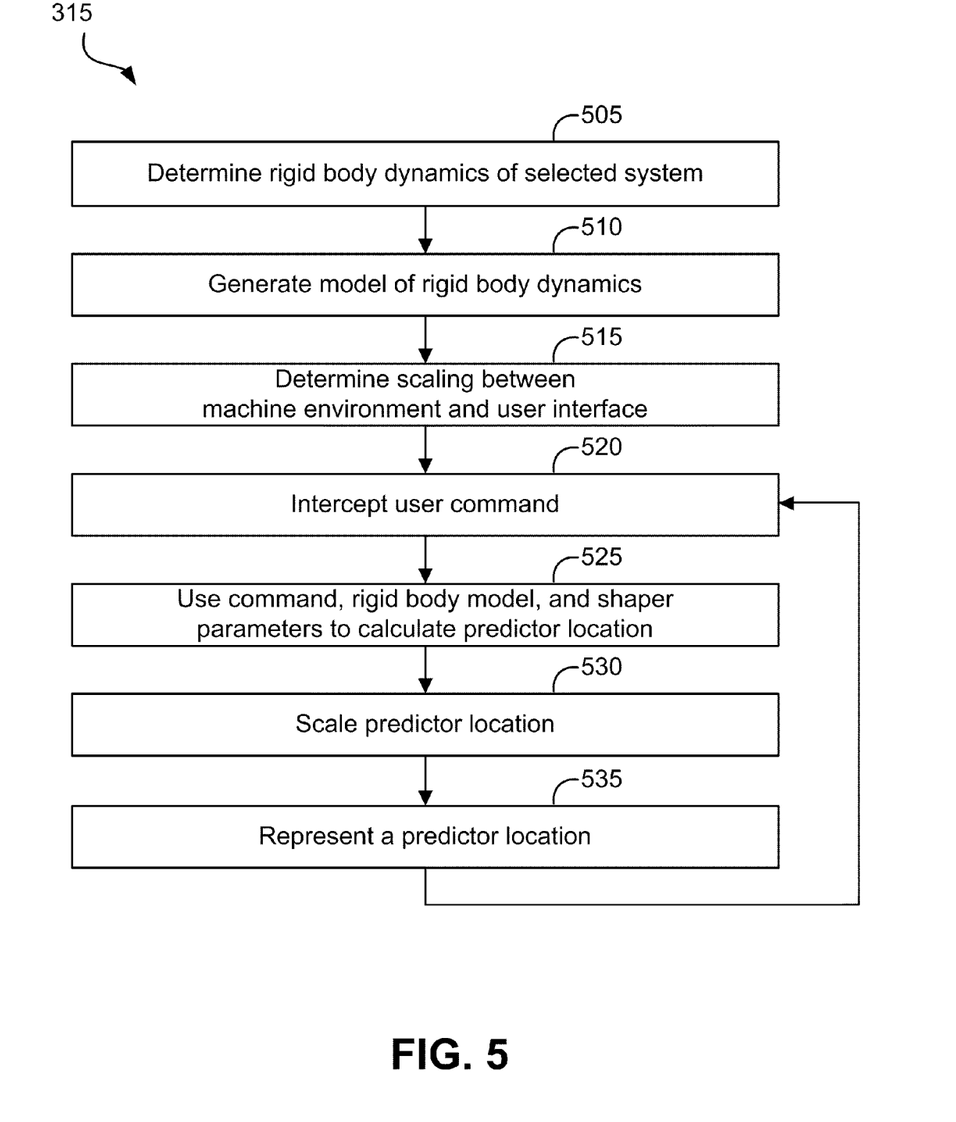
FIG. 5 is a flowchart that illustrates a method for a predictive element in accordance with an embodiment of the present disclosure.

FIG. 5 is a flowchart that illustrates a method for a predictive element 320 in accordance with an embodiment of the present disclosure. Starting with block 505, the rigid-body approximation can be calculated by determining the rigid-body dynamics of a positioning system 310. Depending on the desired implementation, these should include actuator dynamics. Once these dynamics are determined, a model of the rigid-body dynamics is generated, as shown in block 510. This model should couple the user command 330 (FIG. 3) to the rigid-body motion. In block 515, the procedure for designing the predictive element 320 is to determine the scaling between the rigid-body approximation and the user interface. For example, on a GUI, the scaling between the physical motion of the positioning system 310 and the screen pixels needs to be determined and used to scale the indication of the system motion. Another example of a user interface is using a laser beam that points to a location on the ground that the object can be moved to using the positioning system 310.

Once the rigid-body dynamics and scaling have been modeled, the predictive element 320 can be implemented. In block 520, a user command is intercepted by the predictive element 320, which is inputted into the model generated in block 510. The predictive element 320 in blocks 525 and 530 calculates a predictor location based on the user command, rigid-body approximation, and constraints of the input shaper 305, and scales the calculated predictor location. Once it is properly scaled, the predictor location can be represented on a desired interface, or through a desired method, such as a laser pointer. Blocks 520, 525, 530, and 535 are repeated at every time step that the predictive element 320 is active.

Figure 6:
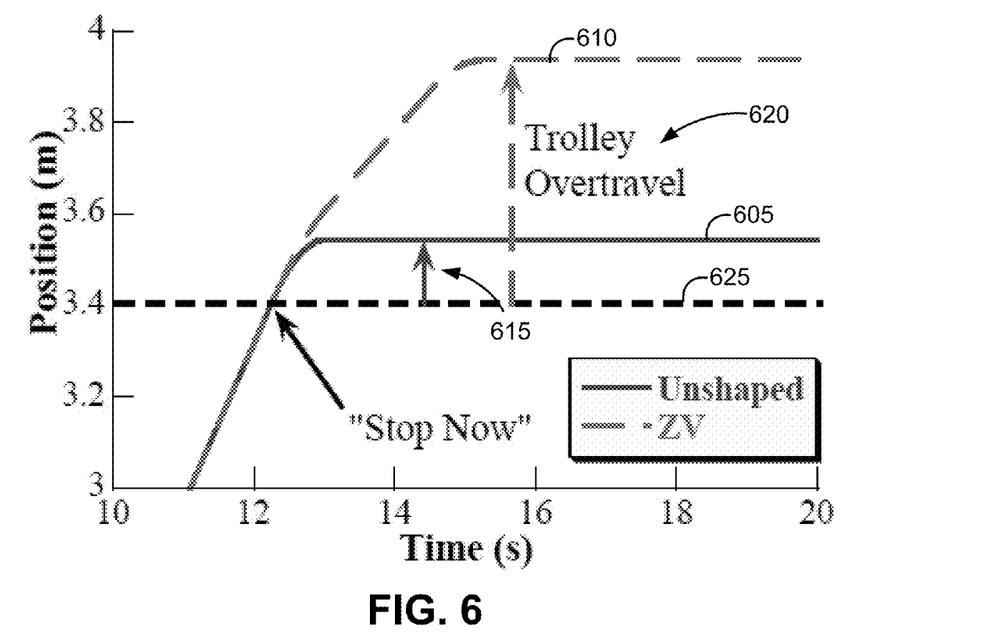
FIG. 6 is a graph that illustrates the relationship between time and position in an example of an unshaped and ZV-shaped overtravel.
Figure 7:
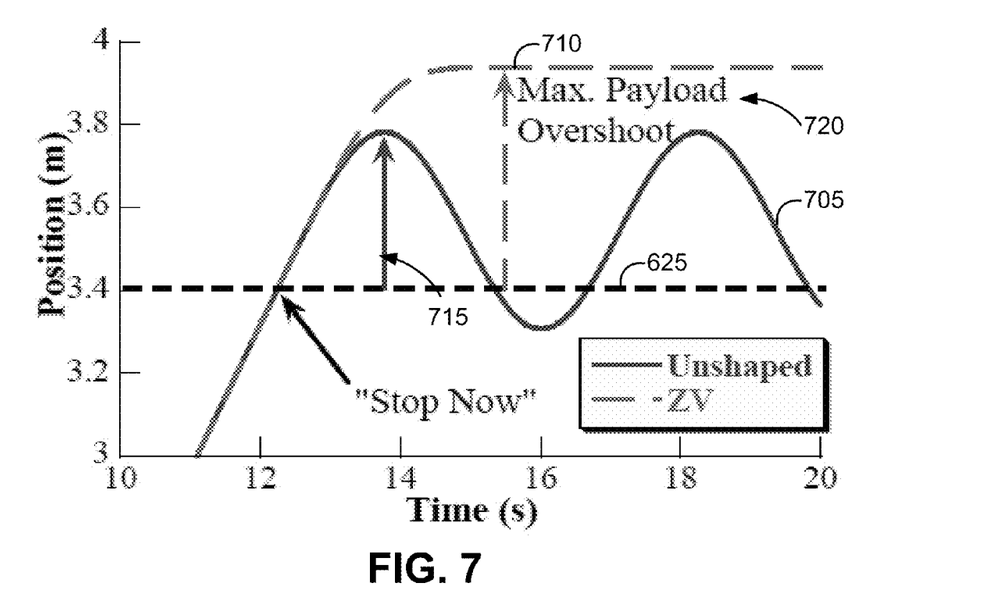
FIG. 7 is a graph that illustrates the relationship between time and position in an example of an unshaped and ZV-shaped maximum overshoot.

The improved positioning precision is generally based on knowledge of system overshoot and overtravel. For example, when commands are issued to a bridge crane, responses of a trolley are depicted in FIG. 6, which is a graph that illustrates the relationship between time and position in an example of an unshaped and ZV-shaped overtravel 605, 610. Notice both the unshaped and ZV-shaped cases result in some trolley overtravel 615, 620. For the ZV-shaped case, the overtravel 620 is larger. The payload responses to the same commands are shown in FIG. 7, which is a graph that illustrates the relationship between time and position in an example of unshaped and ZV-shaped maximum overshoot 715, 720. Notice that the unshaped command 705 exhibits significant oscillation, resulting in a maximum deviation 715 from the desired position 625 that is much greater than the trolley positioning error 615. However, for the ZV-shaped case 710, the payload response exhibits no oscillation and the payload deviation 720 from the desired position is equal to the trolley overtravel 620.

Figure 8:
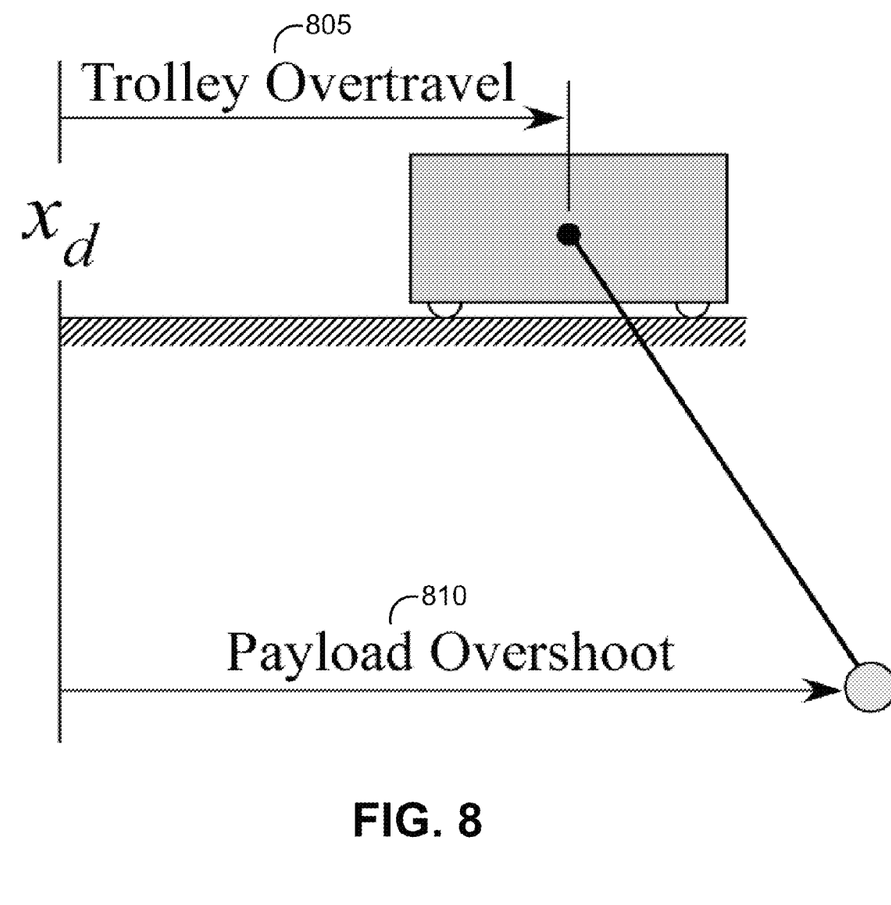
FIG. 8 is a diagram of a trolley overtravel and payload overshoot in accordance with an embodiment of the present disclosure.
Figure 9:
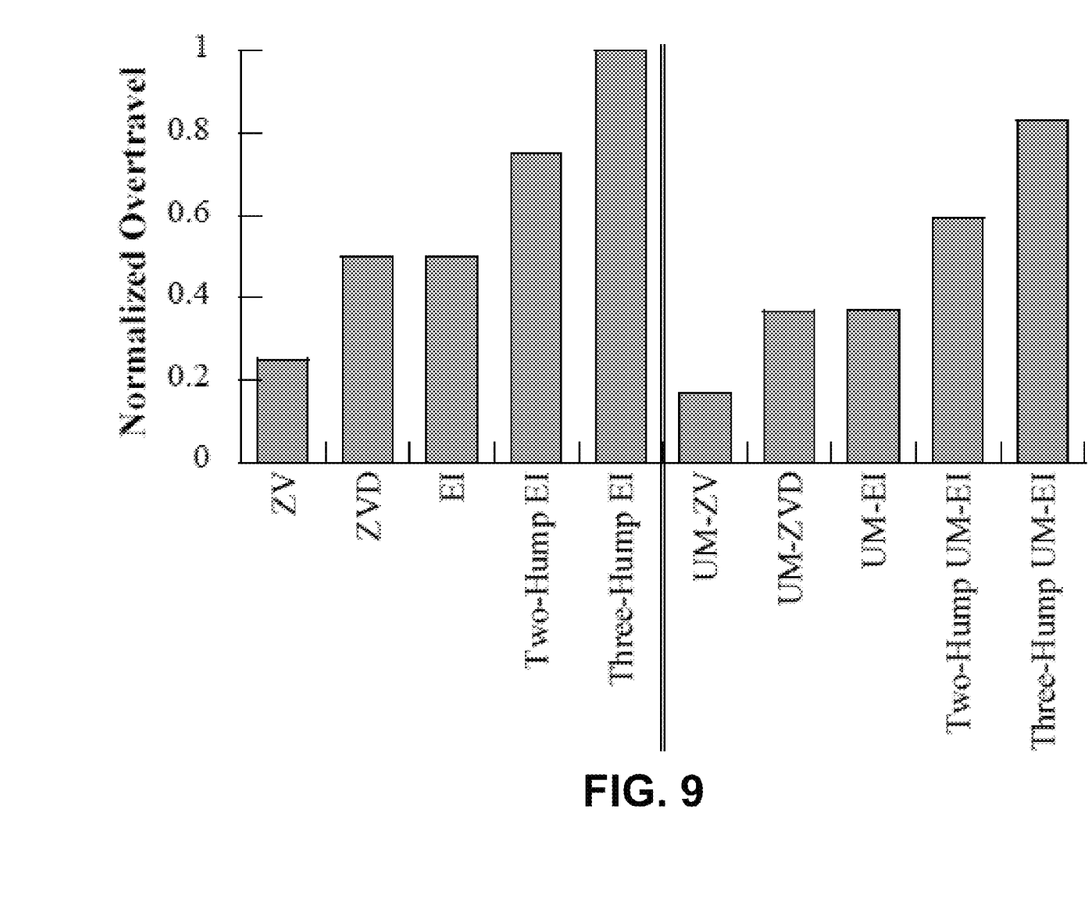
FIG. 9 is a graph that illustrates a normalized overtravel for many types of input shapers.

In this document, the trolley's deviation from the desired position will be called overtravel. The maximum deviation of the payload from the desired position will be called overshoot. The difference between trolley overtravel and payload overshoot is shown schematically in FIG. 8, which is a diagram of trolley overtravel 805 and payload overshoot 810 in accordance with an embodiment of the present disclosure. FIG. 8 shows a variable $x_d$ that represents the desired final position. The normalized overtravel was described in Equation 3. The normalized overtravel of several common input shapers is shown in FIG. 9, which include, but are not limited to, zero vibration (ZV), zero vibration and derivative (ZVD), extra-insensitive (EI), two-hump EI, three-hump EI, unity magnitude-zero vibration (UM-ZV), unity magnitude-zero vibration and derivative (UM-ZVD), UM-EI, two-hump UM-EI and three-hump UM-EI. To the left of the vertical line are shapers that have positive impulses, sorted from left to right according to robustness. The more robust, longer duration shapers produce larger amounts of overtravel. To the right of the vertical line are several common unity magnitude shapers. The impulse amplitudes for unity magnitude shapers can be constrained to approximately +/−1. The more robust, longer duration shapers produce larger amounts of overtravel. Notice, however, that the unity magnitude shapers overtravel less than their positive counterparts because the unity magnitude equivalent shapers are shorter in duration.

To better understand what these values of normalized overshoot mean, simulations of a typical industrial bridge crane were used. It has a maximum velocity of approximately 0.35 m/s. In the simulations, the suspension cable length was set to approximately 5 m. The crane is driven by velocity pulses with a ramp-time of approximately 0.8 s, meaning it takes 0.8 s to accelerate to (and decelerate from) maximum velocity. However, to test a range of ramp-times, simulations were conducted over ramp-times ranging from 0.0 s to 3.0 s. For all cases, the command time was chosen to be long enough that the trolley reached its maximum velocity before deceleration began.

Figure 10:
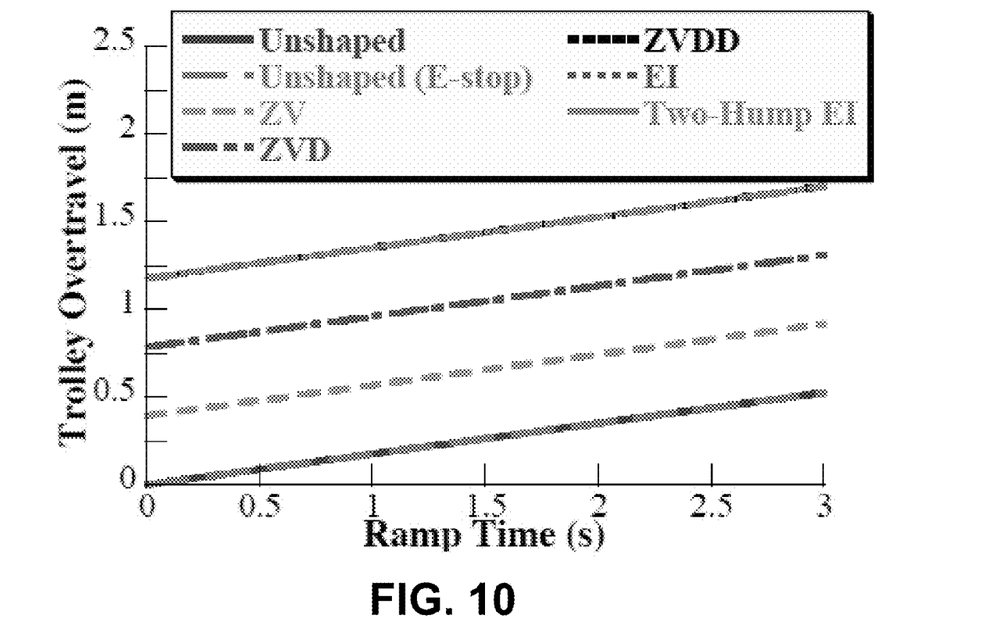
FIG. 10 is a graph that illustrates the relationship between ramp time and trolley overtravel for positive shapers.

FIG. 10 is a graph that illustrates the relationship between ramp time and trolley overtravel for positive shapers. The input-shaped commands display larger amounts of trolley overtravel than the unshaped cases across all values of the ramp time. Longer, more robust shapers display larger amounts of overtravel than shorter, less robust shapers. The overtravel of the shaped commands increases with ramp time at the same rate as the unshaped commands (i.e., the slopes are the same). The overtravel caused by input shaping remains constant in this example.

Figure 11:
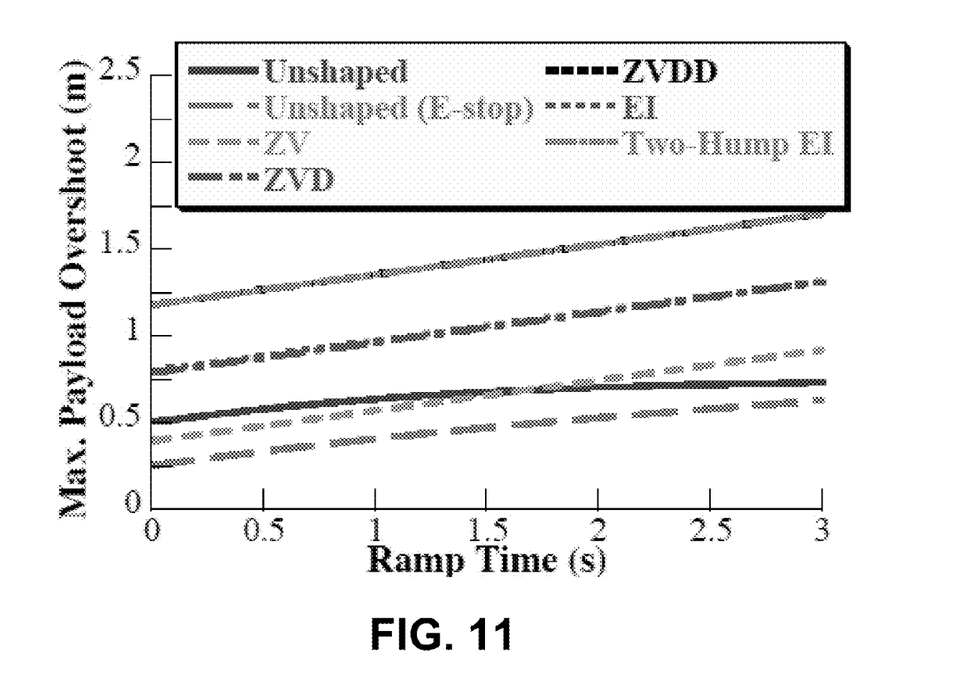
FIG. 11 is a graph that illustrates the relationship between ramp time and maximum payload overshoot for positive shapers.

FIG. 11 is a graph that illustrates the relationship between ramp time and maximum payload overshoot for positive shapers. Both unshaped cases exhibit more payload overshoot than trolley overtravel. However, the maximum payload overshoot and trolley overtravel are nearly equal for the shaped commands. This is because each shaped command excites only a small amount of vibration. In this Figure, for ramp times below 1.5 s, the maximum payload overshoot for the ZV shaped command is less than that of the unshaped command. That is, if the trolley overtravels farther than the unshaped case, the payload does not. Similar trends exist for input shapers with negative impulses.

Figure 12:
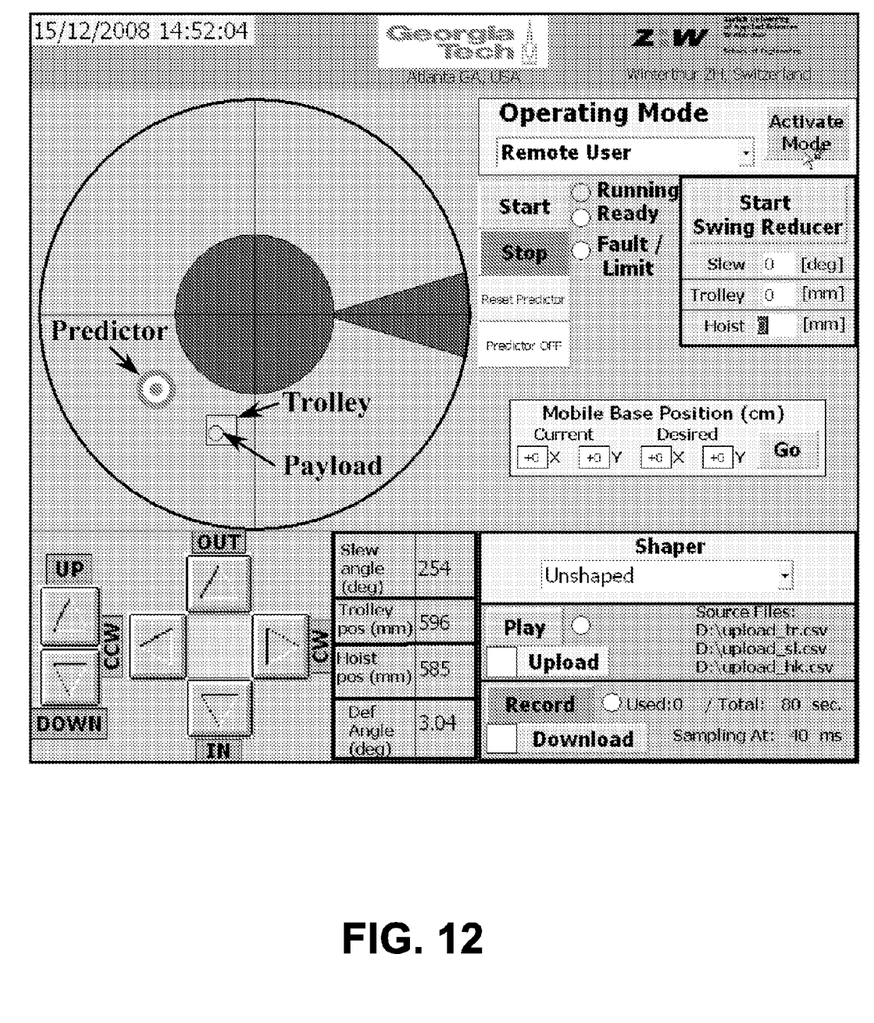
FIG. 12 is an example of tower crane GUI with predictive element in accordance with an embodiment of the present disclosure.

FIG. 12 is an example of tower crane GUI with predictive element 320 in accordance with an embodiment of the present disclosure. In the upper left of the GUI is an overhead view of the crane workspace. The square represents the location of the overhead trolley and the circle is the payload. The bulls-eye is the predictive GUI element. As the crane moves, the predictive element 320 remains ahead of the trolley and payload.

When the user ceases giving inputs, the trolley and payload come to rest over the bullseye. The crane operator's task is simplified to placing the bullseye over the desired final position.

Figure 13:
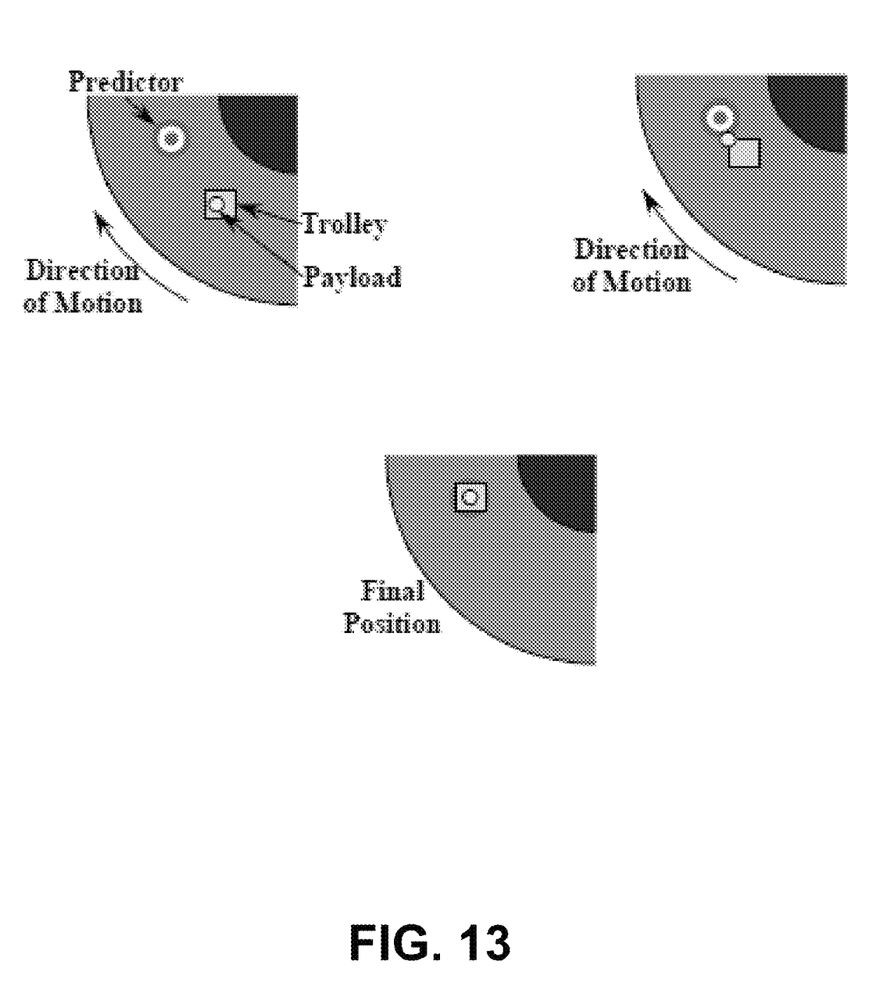
FIG. 13 illustrates an example of a predictive GUI sequence for clockwise stewing move in accordance with an embodiment of the present disclosure.

In an example implementation, a clockwise slewing move is represented in FIG. 13. In the upper left of the figure, the crane is moving at full velocity and the position of the predictor is significantly ahead of the trolley position. As the crane begins to decelerate, shown in the upper right, the trolley's position begins to converge to that of the predictor. In the bottom of the figure the crane has stopped and the predictor, trolley, and payload positions are aligned.

Figure 14:
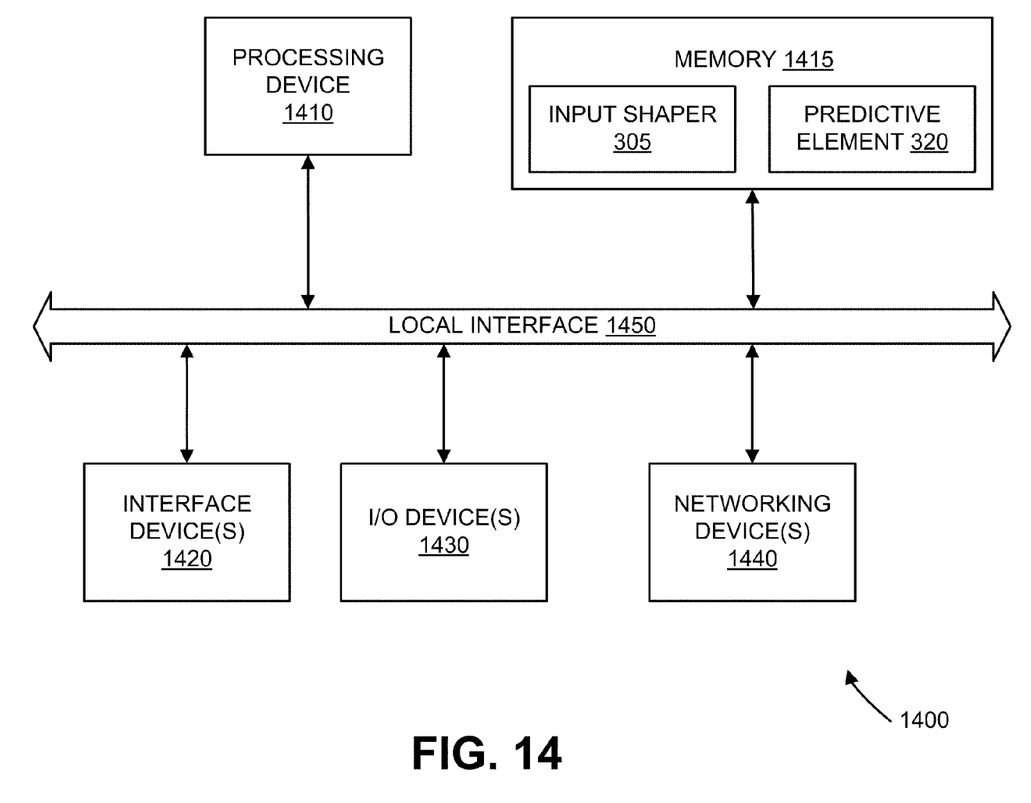
FIG. 14 is a block diagram illustrating an exemplary architecture for a computing device that can be used to implement the input shaper and the predictive element of the human-operated system.

FIG. 14 is a block diagram illustrating an exemplary architecture for a computing device 1400 that can be used to implement the input shaper 305 and the predictive element 320 of the human-operated system 300. As indicated in FIG. 14, the computing generic computer 1400 comprises a processing device 1410, memory 1415, one or more user interface devices 1420, one or more I/O devices 1430, and one or more networking devices 1440, each of which is connected to a local interface 1450. The processing device 1410 can include any custom made or commercially available processor, a central processing unit (CPU) or an auxiliary processor among several processors associated with the generic computer 1400, a semiconductor based microprocessor (in the form of a microchip), or a macroprocessor. The memory 1415 can include any one or a combination of volatile memory elements (e.g., random access memory (RAM, such as DRAM, SRAM, etc.)) and nonvolatile memory elements (e.g., ROM, hard drive, tape, CDROM, etc.).

The one or more user interface devices 1420 comprise those components with which the user (e.g., human operator) can interact with the generic computer 1400. Where the generic computer 600 comprises a server computer or similar device, these components can comprise those typically used in conjunction with a PC such as a keyboard and mouse.

The one or more I/O devices 1430 comprise components used to facilitate connection of the generic computer 1400 to other devices and therefore, for instance, comprise one or more serial, parallel, small system interface (SCSI), universal serial bus (USB), or IEEE 1394 (e.g., Firewire™) connection elements. The networking devices 1440 comprise the various components used to transmit and/or receive data over networks (not shown), where provided. By way of example, the networking devices 1440 include a device that can communicate both inputs and outputs, for instance, a modulator/demodulator (e.g., modem), a radio frequency (RF) or infrared (IR) transceiver, a telephonic interface, a bridge, a router, as well as a network card, etc.

The memory 1415 normally comprises various programs (in software and/or firmware) including an operating system (O/S) (not shown). The O/S controls the execution of programs, and provides scheduling, input-output control, file and data management, memory management, and communication control and related services.

The systems and methods disclosed herein can be implemented in software, hardware, or a combination thereof. In some embodiments, the system and/or method is implemented in software that is stored in a memory and that is executed by a suitable microprocessor (µP) situated in a computing device. However, the systems and methods can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example, but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) optical fiber and compact disc read-only memory (CD-ROM).

Note that the computer-readable medium could even be paper or another suitable medium on which the program is printed. Using such a medium, the program can be electronically captured (using, for instance, optical scanning of the paper or other medium), compiled, interpreted or otherwise processed in a suitable manner, and then stored in a computer memory. In addition, the scope of the certain embodiments of the present disclosure includes embodying the functionality of the preferred embodiments of the present disclosure in logic embodied in hardware or software-configured mediums.

It should be noted that any process descriptions or blocks in flowcharts should be understood as representing modules, segments, or portions of code which include one or more executable instructions for implementing specific logical functions or steps in the process. As would be understood by those of ordinary skill in the art of the software development, alternate embodiments are also included within the scope of the disclosure. In these alternate embodiments, functions may be executed out of order from that shown or discussed, including substantially concurrently or in reverse order, depending on the functionality involved.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the International Receiving Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. It is intended that the application is defined by the claims appended hereto.

What is claimed is:

1. A human-operated system comprising:
    a positioning system that moves an object from one location to a stopping position;
    a computing device that controls the movement of the positioning system responsive to receiving a user command; and
    an input shaper that is coupled to the computing device of the positioning system, wherein the input shaper estimates an overtravel of the positioning system and determines an overtravel constraint that is factored into the movement of the positioning system, wherein the computing device moves the positioning system based on the overtravel constraint in a manner that limits the overtravel of the positioning system as well as the overtravel, deflection and vibration of the object at the stopping position.

2. The human-operated system of claim 1, wherein the object overshoots the location of the positioning system as the object is being moved, wherein the input shaper estimates the movement of the positioning system to the location of the overshot object and determines the overtravel constraint based on the estimated movement, wherein the computing device moves the positioning system based on the overtravel constraint reducing overtravel, deflection and vibration of the object on the positioning system.

3. The human-operated system of claim 1, wherein the input shaper is designed to include constraints that limit the overtravel of the positioning system, the limit on the overtravel is calculated based on at least one of the following: the natural frequencies and damping ratios, robustness, vibration limit, vibration constraint, and impulse amplitude constraint of dominant system modes.

4. The human-operated system of claim 1, wherein the input shaper minimizes the time of the last impulse while satisfying vibration, overtravel, and impulse amplitude constraints.

5. The human-operated system of claim 1, further comprising a predictive element that represents a predictor location responsive to the user command provided by the human operator.

6. The human-operated system of claim 1, wherein the predictive element is designed to include a predetermined rigid-body approximation of the positioning system based on the reduced deflection and vibration of the positioning system caused by the input shaper.

7. The human-operated system of claim 6, wherein the predictive element is designed to include a predetermined scaling between the rigid-body approximation and the user interface and a predetermined scaling of the predictor location on the user interface.

8. The human-operated system of claim 6, wherein the predictive element calculates the predictor location using the user command, rigid-body approximation and the input shaper.

9. A method of moving a positioning system in a human-operated system, comprising:
    receiving a user command from a human operator instructing a positioning system to move an object from one location to a stopping position;
    estimating an overtravel of the positioning system;
    determining an overtravel constraint that is factored into the movement of the positioning system; and
    moving the positioning system based on the overtravel constraint in a manner that limits the overtravel of the positioning system as well as the overtravel, deflection and vibration of the object at the stopping position.

10. The method of claim 9, further comprising determining a limit on the overtravel of the positioning system, the limit on the overtravel is calculated based on at least one of the following: the natural frequencies and damping ratios, robustness, vibration limit, vibration constraint, and impulse amplitude constraint of dominant system modes.

11. The method of claim 9, further comprising indicating a predictor location on a user interface responsive to the user command provided by the human operator.

12. The method of claim 11, further comprising determining a rigid-body approximation of the positioning system based on the reduced deflection and vibration of the positioning system caused by an input shaper.

13. The method of claim 12, further comprising calculating the predictor location based on the user command, rigid-body approximation and the input shaper.

14. The method of claim 12, further comprising:
    determining the scaling between the rigid-body approximation and the user interface; and
    scaling the predictor location on the user interface.

15. A computing device of a human-operated system that receives a user command from a human operator to control the movement of a positioning system, comprising:
    a processing device; and
    memory including an input shaper which has instructions that are executed by the processing device, the instructions including the following logics:
        estimating overtravel of the positioning system,
        determining an overtravel constraint that is factored into the movement of the positioning system, and
        moving the positioning system based on the overtravel constraint in a manner that limits the overtravel of the positioning system as well as the overtravel, deflection and vibration of the object at a stopping position as the object is moved from one location to the stopping position.

16. The computing device of claim 15, wherein the input shaper comprises the logic of determining a limit on the overtravel of the positioning system, the limit on the overtravel is calculated based on at least one of the following: the natural frequencies and damping ratios, robustness, vibration limit, vibration constraint, and impulse amplitude constraint of dominant system modes.

17. The computing device of claim 15, wherein the memory includes a predictive element that comprises the logic of representing a predictor location responsive to the user command provided by the human operator.

18. The computing device of claim 17, wherein the predictive element comprises the logic of representing a predetermined rigid-body approximation of the positioning system based on the reduced deflection and vibration of the positioning system caused by the input shaper.

19. The computing device of claim 18, wherein the predictive element comprises the logic of calculating the predictor location based on the user command, rigid-body approximation and the input shaper.

20. The computing device of claim 18, wherein the predictive element comprises the logic of:
    representing a predetermined scaling between the rigid-body approximation and the user interface; and
    representing a predetermined scaling the predictor location on the user interface.

* * * * *